United States Patent [19]

Hsieh

[11] Patent Number: 4,654,315
[45] Date of Patent: Mar. 31, 1987

[54] LOW DIELECTRIC LOSS SILICON NITRIDE BASED MATERIAL

[75] Inventor: Martin Y. Hsieh, Palo Alto, Calif.

[73] Assignee: GTE Products Corporation, Stamford, Conn.

[21] Appl. No.: 721,118

[22] Filed: Apr. 8, 1985

[51] Int. Cl.$^4$ .................. C04B 35/58; C04B 35/10
[52] U.S. Cl. ................................ 501/98; 75/233; 501/152
[58] Field of Search .............. 501/98, 152; 75/233; 343/872

[56] References Cited

U.S. PATENT DOCUMENTS

| | | | |
|---|---|---|---|
| 4,025,351 | 5/1977 | Masaki | 501/98 |
| 4,147,911 | 4/1979 | Nishitani | 264/25 |
| 4,327,187 | 4/1982 | Komatsu et al. | 501/98 |
| 4,354,990 | 10/1982 | Martinengo et al. | 501/154 |
| 4,358,772 | 11/1982 | Leggett | 343/872 |
| 4,376,652 | 3/1983 | Buljan | 501/97 |
| 4,383,958 | 5/1983 | Moschetti et al. | 501/98 |
| 4,407,970 | 10/1982 | Komatsu et al. | 501/98 |
| 4,496,503 | 1/1985 | Ezis et al. | 264/56 |
| 4,511,402 | 4/1985 | Miura et al. | 75/233 |
| 4,521,525 | 6/1985 | Hsieh | 501/98 |
| 4,542,072 | 9/1985 | Hsieh | 428/698 |
| 4,552,851 | 11/1985 | Hsieh | 501/98 |

*Primary Examiner*—Mark L. Bell
*Attorney, Agent, or Firm*—Donald R. Castle

[57] ABSTRACT

A composition having a low dielectric constant and low dielectric loss tangent from room temperature to at least about 1100° C. which comprises a silicon nitride based material containing an effective amount of a sintering aid selected from lanthanum oxide, yttrium oxide, lanthanum aluminate, yttrium aluminate, aluminum oxide and mixtures thereof and an effective amount of a low dielectric loss promotor selected from the group consisting of iron, chromium and mixtures thereof is a suitable radome material and electromagnetic window material.

4 Claims, No Drawings

LOW DIELECTRIC LOSS SILICON NITRIDE BASED MATERIAL

FIELD OF THE INVENTION

This invention relates to a silicon nitride composition having a low dielectric constant and a low dielectric loss over a wide temperature range. More particularly it relates to a silicon nitride based material containing an effective amount of certain sintering aids and an effective amount of an additive selected from iron, chromium and mixtures thereof to promote a low dielectric loss and their oxides or compounds.

BACKGROUND OF THE INVENTION

In radome window applications of dielectric materials, it is desirable to have materials with the following dielectric properties: (a) low dielectric constant, (b) low dielectric loss, and (c) dielectric constant and loss tangent relatively independent of temperatures.

U.S. Pat. No. 4,358,772 states that for acceptable power transmission efficiency for radome materials, values of less than 10 and 0.01 are required for the dielectric constant and loss tangent respectively. That patent also indicates that ceramic materials such as silicon nitride, alumina, silica, PYROCERAM ® (trademark of Corning Glass Corporation) cordierite, mullite and beryllia are suitable radome materials but none alone as a monolithic wall are suitable because none have the combination of a dielectric constant below 10 and a loss tangent of 0.01 and rain erosion and thermal stress resistance. That patent discloses a 5 layer composite consisting of 3 layers of silicon nitride alternating with 2 layers of fused silica. The silicon nitride is relatively pure silicon nitride having been vapor deposited from silicon tetrachloride and ammonia in a hydrogen atmosphere. The silicon nitride layers are disclosed to have a dielectric constant of 6 and a loss tangent of $9 \times 10^{-3}$.

Materials have excellent properties at high temperature such as thermal shock resistance, mechanical strength, etc., are more desirable for high temperature and/or high power window applications. Silicon nitride materials have high mechanical strength at room temperature and high temperatures, and also have excellent thermal shock resistance. However, it is difficult to sinter silicon nitride to high density without using sintering aids. Furthermore, sintering aids play a major role in the overall dielectric properties of silicon nitrides. Thus, development and discovery of low dielectric loss intergranular phase and/or modify bulk crystalline properties are very important to obtain good dielectric materials. Usually the dielectric properties of silicon nitrides (hot pressed, reaction bonded and pressureless sintered) have dielectric constants ranging from about 7.5 to about 9 and dielectric loss tangents higher than about 0.001, more particularly from about 0.002 to about 0.02. The dielectric loss tangent is usually highly dependent on temperature. Materials with high loss and adverse temperature dependent properties are not desirable for electromagnetic window applications. Silicon nitride type materials consisting essentially of silicon nitride and $Y_2O_3$ and $Al_2O_3$ as sintering aids are discussed in "Pressureless Sintered Silicon Nitride as a Promising Candidate for Radome Materials", 17th *Symposium on Eletromagnetic Windows*, Atlanta Ga., July 25-27, 1984, by M. Y. Hsieh, H. Mizuhara and P. W. Smith. These materials are designated in that article as SNW-1000. Those materials were shown to have properties suitable for high temperature radome applications. Materials which have even lower dielectric constant and lower loss tangent and remain essentially unchanged through the temperature range of from about 25° C. to about 1100° C. would be an advancement in the art.

SUMMARY OF THE INVENTION

In accordance with one aspect of this invention, there is provided a composition having low dielectric constant and low dielectric loss tangent. The composition comprises a silicon nitride based material, an effective amount of a sintering aid selected from aluminum oxide, lanthanum oxide, yttrium oxide, yttrium aluminate, lanthanum aluminate and mixtures thereof and an effective amount of iron, chromium and mixtures thereof as an additive to promote low dielectric loss.

DETAILED DESCRIPTION OF THE PRESENT INVENTION

For a better understanding of the present invention, together with other and further objects, advantages, and capabilities thereof, reference is made to the following disclosure and appended claims in connection with the foregoing description of some of the aspects of the invention.

The composition of this invention is a silicon nitride based material wherein selected sintering aids are added in a sufficient quantity to achieve a sintered density of greater than about 96% of theoretical. High density samples of 99% or above of theoretical density are desirable in terms of evaluating the "true" dielectric properties. Porosity in samples will reduce the dielectric constant and dielectric loss tangent. This is the reason why some of the published data show low dielectric constants, compared with dense bodies. This gives a false impression of low dielectric constants of various materials including reaction bonded silicon nitride. Furthermore, high dense samples have better mechanical strength, wearing properties and reliability.

Slightly porous materials may be desirable for applications, in which the thermal insulation is desirable. In view of this, low contents of sintering aids such as 4% to 8% (by weight) are acceptable depending on specific applications. For example, properties of sintered body varies as sintering aids are reduced. Some trends are listed as follows:

(1) Density drops.
(2) Dielectric constant drops.
(3) Dielectric loss tangent is highly depending on intergranular phase (s).
(4) Value of loss tangent change with composition can be in the order of 100 times. Thus, the effects of 5% pores can be considered neglected, compared with controlling and on loss tangent developing a low loss intergranular phase.
(5) Generally mechanical properties such as strength, hardness, wearing properties drop as sintered density drops. Usually, the modulus of rupture (MOR) value is about 80,000–120,000 psi at room temperature, depending on compositions and processes. In some applications, the mechanical strength can be as low as 40–50,000 psi at room temperature and can be acceptable.

Suitable sintering aids are lanthanum oxide, yttrium oxide, aluminum oxide, lanthanum aluminate, yttrium aluminate, and mixtures thereof. An amount of sintering aid is used which will achieve a density of at least about 96% of theoretical. Amounts of sintering aids ranging from about 3% by weight to about 20% by weight are effective, however, from about 4% to about 16% by weight are preferred. It is preferred to use lanthanum aluminate as the source of lanthanum oxide because lanthanum oxide is hygroscopic. If additional aluminum oxide is desired then aluminum oxide can be added. A mixture of about 8% by weight of lanthanum aluminate and about 8% aluminum oxide is especially preferred as a sintering aid.

The additive that is used as a low dielectric loss promoter is selected from iron, chromium and mixtures thereof. The low dielectric loss promoter can be iron metal or chromium metal or can be in the form of compounds such as iron oxide or chromium oxide. Mixtures of iron and chromium can be used such as a mixture of iron and chromium metals. Compounds such as iron chromite can also be used. Relative small amounts, such as 0.05%, are effective to reduce the dielectric loss tangent. However, it is preferred to use from about 0.1% to about 2% by weight.

Co-pending U.S. patent application Ser. No. 614,896, filed May 29, 1984 by the inventor of this invention and assigned to the same assignee, discloses a silicon nitride composition consisting essentially of from about 3% to about 10% by weight of $La_2O_3$ and 0 to 4% $Al_2O_3$ balance $Si_3N_4$. Highly pure $Si_3N_4$ of at least 99.9% purity is used. The material is hot pressed at a temperature of from about 1700° C. to about 1800° C. with a pressure of 3000 to 5000 psi used. Such bodies exhibit high hardness. That application does not disclose the dielectric properties of the materials produced and as hereinafter shown would not have the low loss tangent of the materials of this invention.

Co-pending U.S. patent application Ser. No. 614,895, U.S. Pat. No. 4,521,525, filed May 29, 1984 by the same inventor and assigned to the same assignee as the present invention discloses materials containing $Si_3N_4$, sintering aids of $La_2O_3$ and $Al_2O_3$ and a hard material selected from titanium carbide, titanium nitride and mixtures thereof. Materials containing hard refractory phases such as TiC and TiN would have dielectric constants above 10 thus making them unsuitable radome materials.

U.S. patent application Ser. No. 631,269 filed July 16, 1984 by the same inventor and assigned to the same assignee as the present invention discloses silicon nitride bodies having a high resistance to phosphoric acid corrosion. These materials contain about 3% to about 18% of lanthanum oxide, from about 0.5% to 5% aluminum oxide, up to about 2% iron, up to about 0.25% each of carbon, calcium aluminum or their oxide, balance $Si_3N_4$. This application does not disclose the dielectric properties of the bodies produced.

U.S. patent application Ser. No. 631,270 filed July 16, 1984 discloses a method of preparing lanthanum aluminate. In this method lanthanum oxide and aluminum oxide are heated at a temperature of from about 1000° C. to about 1450° C. for about 3 to about 20 hours. This process is suitable for preparing the lanthanum aluminate useful in this invention.

U.S. patent application Ser. No. 606,044 filed May 3, 1984 discloses a cold press and sintering process suitable for producing the bodies of this invention. In that process an admixture of silicon nitride and the lanthanum oxide and aluminum oxide sintering aids is formed and pressed to form a green compact which is thereafter sintered to near theoretical density.

U.S. patent application Ser. No. 606,047, U.S. Pat. No. 4,552,851, discloses a method for preparing yttrium aluminate. This process is useful for preparing the yttrium aluminate useful in this invention. To more fully illustrate this invention, the following non-limiting examples are presented. All parts, portions, and percentages are by weight unless otherwise stated.

EXAMPLE 1

Samples are prepared by dry ball milling the appropriate amounts of materials in a Scott-Murray mill. About a 400 gram charge is used and about 16 kilogram silicon nitride 1" diameter grinding media is used. The materials are milled for about 36 hours. After milling 6 samples for testing are prepared by pressing into rectagular bars using about 20,000 psi. The bars are then sintered at about 1760° C. for about 4 hours in one atmosphere of nitrogen gas. All samples are above about 99% of the theoretical density.

TABLE 1

| Sample | Composition w/o | | | | Properties | |
|---|---|---|---|---|---|---|
| | $Si_3N_4$ | $Al_2O_3$ | $La_2O_3$ | $Fe_2O_3$ | Dielectric Constant | Loss Tangent |
| A | balance | 3 | 9 | .006 | 8.0 | $86 \times 10^{-3}$ |
| B | balance | 3 | 9 | 0.8 | 7.27 | $0.9 \times 10^{-3}$ |

EXAMPLE 2

Following the precedure of Example 1 additional samples are prepared having the composition listed in Table 2. Dielectric properties are also measured and given in Table 3.

TABLE 2

| | Composition (WT %) | | | | |
|---|---|---|---|---|---|
| Sample | $Si_3N_4$ | $Al_2O_3$ | $La_2O_3$ | Fe | $Fe_2O_3$ |
| C | Balance | 2 | 6 | 0.8 | — |
| D | Balance | 4 | 12 | 0.8 | — |
| E | Balance | 10 | 6 | 0.8 | — |
| F | Balance | 3 | 9 | 0.8 | — |
| F-1 | Balance | 3 | 9 | — | 1.14 |
| D-1 | Balance | 4 | 12 | — | 1.14 |

TABLE 3

| Dielectric Properties at 9.375 GHz | | | |
|---|---|---|---|
| Sample | | Dielectric Constant | Loss Tangent |
| C | 26 | 6.99 | 0.0008 |
| | 600 | 6.99 | 0.001 |
| | 900 | 7.02 | 0.001 |
| | 1100 | 7.07 | 0.001 |
| D | 26 | 7.66 | 0.0008 |
| | 600 | 7.68 | 0.001 |
| | 900 | 7.68 | 0.002 |
| | 1100 | 7.72 | 0.003 |
| E | 26 | 6.77 | 0.0008 |
| | 600 | 6.77 | 0.0009 |
| | 900 | 6.78 | 0.0009 |
| | 1100 | 6.79 | 0.0009 |
| F | 26 | 7.45 | 0.0008 |
| | 600 | 7.46 | 0.0008 |
| | 900 | 7.48 | 0.0009 |
| | 1100 | 7.50 | 0.001 |
| F-1 | 26 | 7.35 | 0.0009 |
| | 600 | 7.35 | 0.001 |
| | 900 | 7.36 | 0.001 |
| | 1100 | 7.40 | 0.001 |
| D-1 | 26 | 7.52 | 0.0008 |

TABLE 3-continued

| Sample | Dielectric Properties at 9.375 GHz | |
|---|---|---|
| | Dielectric Constant | Loss Tangent |
| 600 | 7.52 | 0.0009 |
| 900 | 7.53 | 0.0009 |
| 1100 | 7.55 | 0.0009 |

EXAMPLE 3

Following essentially the same procedure as given in Example 1, additional samples are prepared having the compositions listed in Table 4. Dielectric properties are measured and given in Table 5.

TABLE 4

| Sample | Composition (WT %) | | | |
|---|---|---|---|---|
| | $Si_3N_4$ | $Al_2O_3$ | $La_2O_3$ | $Cr_2O_3$ |
| G | balance | 3 | 9 | 0.25 |
| H | balance | 3 | 9 | 1 |
| I | balance | 3 | 9 | 2 |

TABLE 5

| Sample | Dielectric Properties at 9.375 Ghz | | |
|---|---|---|---|
| | Measuring Temperature (°C.) | Dielectric Constant | Loss Tangent |
| G | 26 | 7.33 | 0.001 |
| | 600 | 7.33 | 0.001 |
| | 900 | 7.35 | 0.001 |
| | 1100 | 7.38 | 0.002 |
| H | 26 | 7.50 | 0.0009 |
| | 600 | 7.50 | 0.0009 |
| | 900 | 7.53 | 0.001 |
| | 1100 | 7.55 | 0.001 |
| I | 26 | 7.60 | 0.0009 |
| | 600 | 7.60 | 0.0009 |
| | 900 | 7.62 | 0.001 |
| | 1100 | 7.64 | 0.002 |

EXAMPLE 4

Following essentially the same procedure as given in Example 1 additional samples are prepared having the compositions listed in Table 6. Dielectric properties are measured and listed in Table 7.

TABLE 6

| Sample | Composition (WT %) | | | |
|---|---|---|---|---|
| | $Si_3N_4$ | $Al_2O_3$ | $La_2O_3$ | $Fe_2O_3$ |
| J | Balance | 3 | 9 | 0.25 |
| K | Balance | 3 | 9 | 1.0 |
| L | Balance | 3 | 9 | 2.0 |

TABLE 7

| Sample | Dielectric Properties at 9.375 GHz | | |
|---|---|---|---|
| | Temperature °C. | Dielectric Constant | Loss Tangent |
| J | 26 | 7.35 | 0.0008 |
| | 600 | 7.35 | 0.0009 |
| | 900 | 7.36 | 0.0009 |
| | 1100 | 7.36 | 0.0009 |
| K | 26 | 7.41 | 0.0008 |
| | 600 | 7.41 | 0.001 |
| | 900 | 7.43 | 0.001 |
| | 1100 | 7.45 | 0.002 |
| L | 26 | 7.58 | 0.0008 |
| | 600 | 7.59 | 0.0008 |
| | 900 | 7.60 | 0.0008 |
| | 1100 | 7.60 | 0.001 |

EXAMPLE 5

Following essentially the same procedure as given in Example 1. Additional samples are prepared having the compositions listed in Table 8. Dielectric properties are also measured and given in Table 9.

TABLE 8

| Sample | (WT %) | | | |
|---|---|---|---|---|
| | $Si_3N_4$ | $Al_2O_3$ | $Y_2O_3$ | $Fe_2O_3$ |
| M | Balance | 2 | 6 | 0.125 |

TABLE 9

| Sample | Dielectric Properties at 9.375 GHz | | |
|---|---|---|---|
| | Measuring Temperature (°C.) | Dielectric Constant | Loss Tangent |
| M | 26 | 7.13 | 0.0009 |
| | 600 | 7.13 | 0.0009 |
| | 800 | 7.13 | 0.0009 |
| | 1100 | 7.19 | 0.001 |

EXAMPLE 6

Following essentially the same procedure as given in Example 1. Additional samples are prepared having the compositions listed in Table 10. Dielectric properties are also measured and given in Table 11.

TABLE 10

| Sample | (WT %) | | | |
|---|---|---|---|---|
| | $Si_3N_4$ | $Al_2O_3$ | $Y_2O_3$ | $Fe_2O_3$ |
| N | Balance | 2 | 13 | 0.125 |
| O | Balance | 2 | 13 | 1.0 |
| P | Balance | 2 | 13 | 2.0 |

TABLE 11

| Sample | Dielectric Properties at 9.375 GHz | | |
|---|---|---|---|
| | Measuring Temperature (°C.) | Dielectric Constant | Loss Tangent |
| N | 26 | 7.74 | 0.0008 |
| | 600 | 7.74 | 0.0008 |
| | 900 | 7.76 | 0.0008 |
| | 1100 | 7.81 | 0.001 |
| P | 26 | 8.04 | 0.0008 |
| | 600 | 8.04 | 0.0008 |
| | 900 | 8.07 | 0.0009 |
| | 1100 | 8.12 | 0.001 |
| O | 26 | 7.70 | 0.0008 |
| | 600 | 7.71 | 0.0008 |
| | 900 | 7.74 | 0.0008 |
| | 1100 | 7.78 | 0.001 |

The above data shows that additions of iron and chromium have beneficial effects upon the dielectric properties of a $Si_3N_4$ system. The beneficial effects are relatively independent of the level of sintering aid use.

While there has been shown and described what are at present considered the preferred embodiments of the invention, it will be obvious to those skilled in the art that various changes and modifications may be made therein without departing from the scope of the invention as defined by the appended claims.

What is claimed is:

1. A composition suitable for radome application consisting essentially of from about 8% by weight to about 16% by weight of a sintering aid consisting of (a) from about 2% by weight to about 10% by weight of aluminum oxide and (b) from about 6% by weight to about 13% by weight of a material selected from the group consisting of lanthanum oxide, yttrium oxide, lanthanum aluminate, yttrium aluminate and mixtures thereof, from about 0.125% by weight to about 0.8% by weight of a low dielectric loss promoter from the group consisting of iron, chromium, iron compounds, chromium compounds and mixtures thereof, balance silicon nitride, said composition having a density of at least about 96% theoretical, said low dielectric loss promoter being effective to provide a low dielectric constant and a low loss tangent that remains essentially unchanged through the temperature range of from about 25° C. to about 1100° C., the dielectric constant being below about 8.0 at about 9.375 gigahertz throughout temperature range, the loss tangent being less than about $1 \times 10^{-3}$ throughout said temperature range.

2. A composition according to claim 1 wherein said sintering aid contains both lanthanum and aluminum oxides.

3. A composition according to claim 1 wherein said sintering aid contains both yttrium and aluminum oxides.

4. An improvement according to claim 1 wherein said low dielectric loss promotor is selected from iron, iron oxide, iron chromite and mixtures thereof.

* * * * *